Aug. 16, 1960

G. C. HOOD ET AL 2,949,343

PURIFYING HYDROGEN PEROXIDE

Filed Sept. 6, 1955

INVENTORS

GEORGE CLEMENT HOOD

RANDOLPH EUGENE SMITH

GINO JOHN PIEROTTI

BY Alan C. Batchelor

THEIR AGENT

United States Patent Office 2,949,343
Patented Aug. 16, 1960

2,949,343

PURIFYING HYDROGEN PEROXIDE

George Clement Hood, Orinda, Calif., Randolph Eugene Smith, Anacortes, Wash., and Gino John Pierotti, El Cerrito, Calif., assignors to Shell Oil Company, New York, N.Y., a corporation of Delaware Filed Sept. 6, 1955, Ser. No. 532,386

10 Claims. (Cl. 23—207)

This invention relates to a process for purifying hydrogen peroxide. More particularly, the invention relates to a method for removing organic contaminants from aqueous hydrogen peroxide solution by extraction with oxygen-containing polar organic solvents. In a still more specific aspect, the present invention relates to a process for purifying hydrogen peroxide initially present in an aqueous solution comprising lower aliphatic alcohol, lower aliphatic carbonyl compound corresponding to the alcohol, and organic impurities, such as lower molecular weight oxygenated compounds including peroxides and other labile organics.

The purification of hydrogen peroxide initially present in aqueous mixture with reactive organic materials presents a number of distinctive problems owing to the tendency of hydrogen peroxide to oxidize or otherwise react with such organic materials. Formation of difficultly separable complexes of hydrogen peroxide and oxygenated organic materials, or of organic peroxides, constitutes one of the problems. The danger of violent decomposition which is associated with the co-presence of hydrogen peroxide and reactive organic materials presents another and a serious problem. There is also the likelihood of excessive losses of hydrogen peroxide (assuming that explosive decomposition can be avoided) caused by slow oxidation of the organics by hydrogen peroxide. On top of all this are the difficulties that are encountered when the organic impurities themselves are unstable, or labile; this difficulty is one of particular moment since the methods heretofore known in the art for recovery and purification of hydrogen peroxide are not well suited to its clean separation from labile organic materials which themselves undergo chemical change during the course of the separation.

A process for purifying hydrogen peroxide, initially present in aqueous mixture with reactive organic materials, by employing such steps as fractionation, evaporation and steam-stripping requires careful design to avoid the hazards of violent decomposition mentioned above. It is customary to employ special safety measures wherever there is a chance, e.g. by malfunctioning of instruments or equipment, of building up a dangerous concentration of organic impurities in the presence of a high concentration of hydrogen peroxide. Such safety measures add substantially to the cost of a commercial installation.

According to the present invention, the need for safety measures in a process of purifying hydrogen peroxide containing organic impurities of peroxidic nature may be substantially reduced or avoided by selectively extracting said impurities from the aqueous hydrogen peroxide solution at an early stage in the process.

Accordingly, it is an object of the present invention to purify aqueous hydrogen peroxide solution containing as impurities oxygenated organic compounds, including peroxidic materials, of relatively low volatility by contacting the solution with a suitable polar oxygen-containing organic solvent to selectively extract the impurities.

Another object of the invention is to provide a practical and safe method for carrying out the recovery or purification of hydrogen peroxide in high yields and at high purity from aqueous mixtures comprising hydrogen peroxide and oxygenated organic materials including lower aliphatic alcohol, corresponding carbonyl compound and other oxygenated organic compounds, utilizing solvent extraction combined with distillatory procedures.

Other objects of the present invention will appear from the following description thereof.

In its simplest modification, the process of the present invention comprises contacting an aqueous solution of hydrogen peroxide containing the above-mentioned organic impurities with a polar oxygen-containing organic solvent which is substantially immiscible with said solution, inert with respect to hydrogen peroxide and which has at least 4 carbon atoms per molecule, and then separating the substantially purified aqueous layer and the solvent layer containing the extracted impurities. The contact is preferably carried out in a multistage, counter-current, liquid-liquid contacting zone, and the resulting raffinate and extract phases may be separately treated to recover solvent therefrom for re-use in the process. Purified aqueous hydrogen peroxide is recovered from the raffinate.

The process of the invention may be further described with reference to the drawings which form a part of the present specification and wherein.

Figure 1:
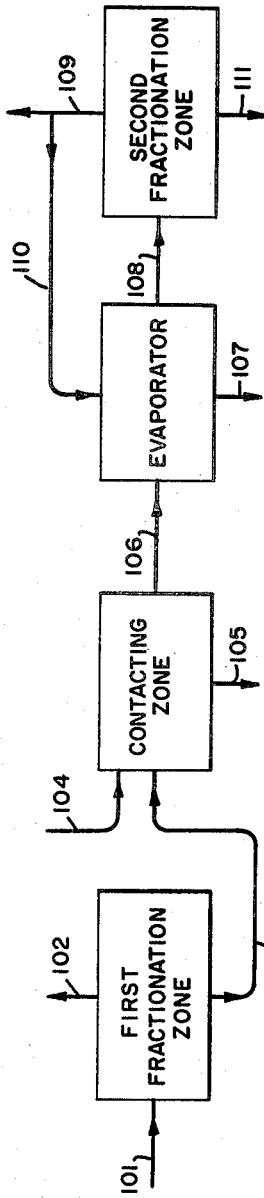
Figure 1 shows schematically the method of the present invention as it may be applied in the production of aqueous hydrogen peroxide of commercial concentrations in the range from 30 to 90% hydrogen peroxide.

In Figure 1 of the drawings, a schematic flow diagram of a suitable sequence of operations is shown. An aqueous mixture comprising hydrogen peroxide, lower aliphatic alcohol, particularly isopropyl alcohol, corresponding carbonyl compound, e.g., acetone when the alcohol is isopropyl alcohol, and other oxygenated organic compounds, is introduced into the purification system via line 101. Impurities which may be present include low molecular weight acids, alcohols, esters, aldehydes and ketones, organic peroxides and labile complexes of hydrogen peroxide with such oxygenated organic compounds. Inorganic compounds, such as salts, e.g. phosphates if a phosphate stabilizer has been included, may be present. The solution may contain from about 5% to about 20%, more typically from about 5% to about 12% hydrogen peroxide by weight, the balance being the organic materials in major amount and water in minor amount. The solution is fractionated in the first fractionating zone to take overhead, via line 102, an aqueous mixture comprising the greater part of the alcohol and corresponding carbonyl compound. The fractionation is conducted under pressures between about 200 and about 1000 mm. Hg and preferably under sub-atmospheric pressure between about 200 and about 700 mm. Hg in the presence of sufficient water (water being added if necessary) to allow the alcohol-water azeotrope to pass overhead and about 20 to 35% by weight aqueous solution of hydrogen peroxide to be withdrawn as bottoms product via line 103.

The liquid bottoms product from the first fractionation zone is conveyed via line 103 to the solvent contacting zone. A suitable solvent, which may be a monocarboxylic acid, monohydric alcohol, ketone or other suitable solvent as defined below, e.g., normal butanol, is introduced into the contacting zone via line 104. The solvent and aqueous solution of hydrogen peroxide are contacted, preferably in a counter-current manner, and settled. The spent solvent, or extract, is removed via line 105 and the purified aqueous solution of hydrogen peroxide, or raffinate, via line 106. The solutions withdrawn via lines 105 and 106 may be separately treated in a suitable manner, e.g. by distillation or by extraction with benzene, to separate the solvent therefrom for re-use in the process. The purified aqueous hydrogen peroxide solution is conducted via line 106 to an evaporator which is operated under a sub-atmospheric pressure preferably of about 100 to 250 mm. Hg. The solution is partially evaporated to leave a liquid residue containing between about 50% and about 65% hydrogen peroxide by weight which is withdrawn via line 107 and may be employed directly as a commercially useful product. The vapors, which have a composition determined by the vapor-liquid equilibrium for the hydrogen peroxide-water system at the pressure employed and the composition of the liquid residue, are conveyed via line 108 to the second fractionation zone, where they are rectified. The overhead product withdrawn via line 109 comprises substantially only water, but may contain traces of volatile or organic materials which have not been removed in the previous steps of the process. A part of the aqueous overhead fraction may be condensed and recycled from the second fractionation zone to the evaporator via line 110. A purified concentrated aqueous solution of hydrogen peroxide, which may be of any desired concentration in the range between 30 and 60% is withdrawn from the second fractionation zone vial line 111. If it is desired to produce hydrogen peroxide of a higher concentration, say 90%, the product in line 111 may be passed to a second evaporation and fractionation stage.

It has been stated above that the crude hydrogen peroxide solutions which are purified according to the method of the present invention contain, in addition to the alcohol and corresponding carbonyl compound, varying but appreciable amounts of other organic impurities including labile organic peroxides and complexes of hydrogen peroxide with oxygenated organic materials which are present. While we do not intend to be bound by any theoretical considerations, it has been ascertained that in the first fractionation zone there occurs, in addition to physical separation of alcohol and corresponding carbonyl compound from aqueous hydrogen peroxide, a partial degradation or decomposition of organic materials comprising peroxy oxygen, such as labile organic peroxides or complexes. Organic products of such degradation or decomposition are removed in part with the overhead fraction from the first fractionation zone and are conveyed in part with liquid bottoms product of the first fractionation step to the contacting zone. In the contacting zone substantially all of the remaining organic impurities carried along in the aqueous hydrogen peroxide are extracted into the polar organic solvent which is substantially immiscible with the aqueous solution. If the solvent employed is of relatively low molecular weight within the suitable range, an appreciable portion thereof may be dissolved in the aqueous phase. In that case, it may be desirable to treat the raffinate by a process such as distillation or solvent extraction to remove all solvent therefrom. If the solvent is relatively volatile and forms an azeotrope with water, e.g. n-butyl alcohol, the solvent may be permitted to remain with the aqueous hydrogen peroxide solution. In the evaporator a substantial portion of the hydrogen peroxide and water is ordinarily carried overhead into the second fractionation zone. Any relatively non-volatile impurities present in the feed and not extracted in the contacting zone, e.g. inorganic impurities, will be carried out with the bottoms from the evaporator. If a solvent such as n-butanol is present in the feed to the evaporator, it will be carried overhead into the second fractionation zone. Volatile organics which may have carried through the process, and solvent such as n-butyl alcohol, are taken overhead with the water in the second fractionation zone, and a purified concentrated hydrogen peroxide solution may be withdrawn from the bottom or near the bottom of the second fractionation zone.

Figure 2:
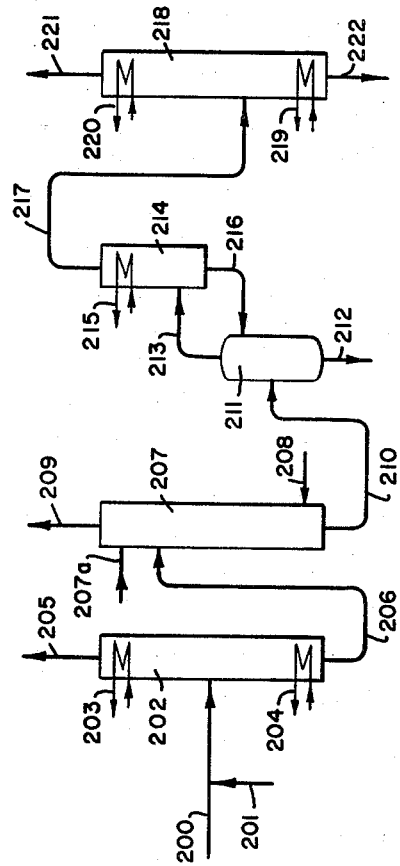
Figure 2 shows schematically equipment adapted for the practice of the present invention.

In the specific embodiment of the process illustrated in Figure 2 the crude feed is introduced via line 200 into fractionating column 202, which is equipped with reflux inducing means 203, overhead line 205, reboiler or internally located coils 204 and bottoms product line 206. Reflux inducing means 203 may be an internal partial condenser or may represent an external reflux system comprising a condenser and suitable piping. In lieu of reboiler or heating coils 204, the lower end of column 202 may be heated by open steam. Inlet line 201 may be provided for introduction of diluent water. Column 202 may be a fractionating column of conventional design, such as a bubble-plate, grid-tray, packed or other suitable column constructed of materials such as porcelain, aluminum or stainless steel which are compatible with hydrogen peroxide solutions. Column 202 is designed according to known methods for separation of the aqueous azeotrope of the alcohol overhead from water, with the additional feature that the tray capacity together with the reboiler capacity are sufficient to give a residence time of the liquid below the feed plate between about 5 minutes and about 100 minutes, preferably between about 10 minutes and about 30 minutes. In column 202 the crude feed is fractionated at a maximum temperature (i.e., reboiler temperature) of at least about 85° C., preferably between about 90° C. and about 120° C., and most desirably between about 90° C. and about 105° C. The pressure measured at the top of the column may be varied within limits according to the desired reboiler temperature and may be maintained within the range, for example, from about 400 to about 700 mm. Hg. There is taken overhead from column 202 via line 205 a mixture of the secondary alcohol-water azeotrope and the ketone, together with a part of the organic impurities, e.g., esters, acids, and other carbonylic compounds. An aqueous solution of hydrogen peroxide is withdrawn as bottoms product from the column via line 206. The bottoms product preferably should contain between about 5% and about 35% by weight hydrogen peroxide, most desirably between about 20% and about 35% by weight. If the initial feed contains insufficient water for this, the readily calculable necessary amount of diluent water may be added via line 201.

Loosely bound complexes and other labile organic peroxide materials are largely but not wholly decomposed in column 202. Typical liquid bottoms product from column 202 will contain from about 2% to about 10% of organic materials based upon the weight of hydrogen peroxide in the product, which organic materials will include acids, esters, carbonylic compounds, alcohols, and peroxidic materials of varying degrees of stability.

Liquid bottoms product from column 202 is conveyed via line 206 to contacting zone 207. This may contain conventional counter-current, continuous, liquid-liquid extraction equipment such as a vertical column equipped with liquid distribution devices at the top and bottom to introduce feed and solvent, and internal liquid-liquid contacting devices such as bubble-plates, perforated-plates or other suitable devices; or zone 207 may represent a number of separate contacting and settling stages contained in separate vessels, in which the solvent and feed are conducted from one end to the other in opposing directions. A suitable solvent, e.g. n-butyl alcohol, is introduced into contacting zone 207 through line 208. Organic impurities contained in the feed in line 206 are extracted therefrom by counter-current contact with n-butyl alcohol. Purified aqueous hydrogen peroxide solution is withdrawn from zone 207 via line 210 while the extract, comprising solvent and organic impurities, is removed via line 209. The extract may be washed in a washing stage of contacting zone 207 with a suitable wash liquid, e.g. pure water, which may be introduced via line 207a, to remove residual hydrogen peroxide from the extract. The extract withdrawn by line 209 may be treated in equipment not shown, e.g. by distillation or solvent extraction, to recover therefrom solvent for reuse in the process and a concentrate of organic impurities which may be discarded. Any peroxide present in the discard stream may be destroyed, if desired, e.g. by treatment with sodium hydroxide. The purified aqueous hydrogen peroxide solution in line 210 may contain some dissolved solvent. It may be treated in equipment not shown, such as by distillation or solvent extraction, to remove solvent for re-use in the process, or it may be directly charged to evaporator 211. Evaporator 211 may be equipped with lines and pumps, not shown, to continuously circulate liquid out of and back to it in order to insure the desired low residence time in the evaporator. Evaporator 211 may be an evaporator of known design, such as a tubular evaporator, constructed preferably of stainless steel so as to minimize decomposition of the hydrogen peroxide during evaporation. Evaporator 211 is operated at a reduced pressure, preferably at a pressure between about 100 and about 250 mm. Hg, and the feed rates to the evaporator system and the rate of withdrawal of the liquid residue (via line 212) may be adjusted to yield a liquid evaporation residue containing between about 50% and about 65% by weight hydrogen peroxide, or, more broadly, between about 40% and 65% by weight.

The vapors evolved in evaporator 211 are passed through line 213 to a short fractionating column 214 which we may term a knock-back column, wherein they are partially condensed by the cooling action of water circulated through internal condenser 215 or by water directly injected into the top of the column, and the condensate returned to evaporator 211 via line 216. The vapors entering column 214 via line 213 comprise a vaporous mixture of water and hydrogen peroxide and may further contain small amounts of volatilized organic impurities which were not extracted in zone 207 and vaporized solvent such as n-butyl alcohol which was not removed from the raffinate obtained in zone 207. By partially condensing these vapors, with rectification, traces of organic impurities will be returned to the condensate and thereby substantially excluded from the vapors of hydrogen peroxide and water which are conveyed to the subsequent concentration column 218. Furthermore, by insertion of a partial rectification column 214 between evaporator 211 and column 218, possible entrainment of impurities in the vapors entering column 218 is minimized. If the contacting system operating in zone 207 is adequately designed and a suitable solvent employed, substantially no volatile organic impurities will be retained in the raffinate stream and column 214 may then be replaced by a simple knockout drum or equivalent entrainment removing means, operating without rectification. When knock-back column 214 is employed, including rectification, it may be a grid-tray, bubble-plate, packed or equivalent column. It should have a capacity of from about 2 to about 7 theoretical plates in order to obtain the desired concentration of and rejection of organic impurities into the liquid residue from the evaporation step, and should be operated at a reflux ratio (reflux/feed, weight basis) of from about 0.05 to about 0.20.

Vapors leaving the top of column 214 are conveyed through line 217 into fractionating column 218, provided with internal reflux condenser 220, overhead line 221, reboiler or heating coils 219, and bottoms line 222. Column 218 may be a fractionating column designed from known principles for rectification and concentration of vaporous mixtures of water and hydrogen peroxide, water being taken overhead and concentrated hydrogen peroxide solution being withdrawn as bottoms product. Column 218 is operated at pressures generally corresponding to those in the evaporator system, taking into account slight pressure drops through the connecting conduits, etc. For example, with vacuum being applied by vacuum pumps (not shown) or barometric condensers (not shown) on line 221, column 218 may be operated at a pressure, measured at the top, of 100 mm. Hg, and a pressure, measured at the bottom, of 130 mm. Hg; column 214 may be operated at a mean pressure of 160 mm. Hg; and evaporator 211 may be operated at a pressure of about 170 mm. Hg.

When solvent such as n-butyl alcohol is present in the charge to column 218, all of the alcohol will be taken overhead admixed with water, via line 221, as azeotrope of the alcohol.

The hydrogen peroxide solution withdrawn from column 218 via line 222 may contain from about 30% to about 60% by weight hydrogen peroxide. This is a pure solution of hydrogen peroxide which may be employed for commercial purposes or, if desired, may be charged to second evaporation and fractionation stage, not shown, for further removal of water and recovery of more highly concentrated aqueous hydrogen peroxide, e.g. up to 90% or higher, as bottoms product.

Figure 3:
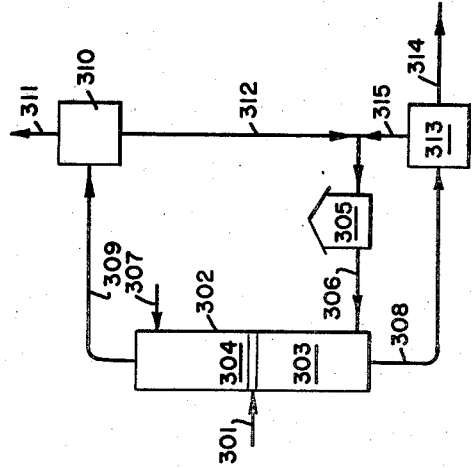
Figure 3 shows in more detail equipment suitable for carrying out the contacting step and associated steps.

A preferred method of operating the solvent contacting zone 207 in Figure 2 is illustrated by means of the schematic flow diagram in Figure 3. An aqueous hydrogen peroxide solution comprising organic impurities, such as the bottoms product from column 202, is introduced via line 301 into solvent extraction zone 302. This may be a continuous counter-current liquid-liquid extraction apparatus, such as a tower equipped with suitable liquid distribution and redistribution devices, known to the art. The tower may comprise an extraction zone 303 and an extract washing zone 304. Solvent is introduced into zone 303 from solvent storage tank 305 via line 306. The solvent may suitably be n-butyl alcohol. Countersolvent, which may suitably be water, may be introduced into zone 304 via line 307. In zone 303 the aqueous hydrogen peroxide solution moves downward countercurrently to the solvent. Purified aqueous hydrogen peroxide solution is taken out through line 308. Due to gravity differentials, the solvent extract continues to move up the column through zone 304. Countersolvent, such as water, introduced through line 307, washes out of the extract any hydrogen peroxide which may be dissolved therein. The hydrogen peroxide-free extract leaves the column via line 309 and may be passed to solvent separation zone 310 which may suitably be a distillation zone, or a solvent extraction zone in which a suitable second solvent, such as benzene is employed to dissolve the first solvent selectively, followed by a distillation to separate benzene and solvent. In any case, the separated impurities are ultimately withdrawn from the system via line 311 and the recovered solvent is returned to solvent storage tank 305 via line 312.

The raffinate removed from column 302 via line 308 may be passed to raffinate treating zone 313 wherein it may be subjected to azeotropic distillation in which an azeotrope of n-butyl alcohol and water is taken overhead and aqueous hydrogen peroxide is withdrawn to be passed to an evaporator, such as 211, via line 314. Instead of a distillation zone, 313 may represent a solvent extraction zone in which a suitable second solvent such as benzene is employed to extract n-butyl alcohol from the aqueous hydrogen peroxide. In either case, the resulting solution of n-butyl alcohol, after separation from the aqueous hydrogen peroxide, is further treated, as by distillation, to recover n-butyl alcohol for return to solvent tank 305 via line 315.

It will be appreciated that the specific arrangement of apparatus indicated in the drawings is subject to certain modifications without departure from the invention. For example, where separate columns have been indicated, such columns may be appropriately combined in a single shell with the necessary suitably positioned catch-trays, vapor by-passes, condensers, etc. Supplemental equipment will be necessary, such as measuring devices and regulating devices, heat exchangers, pumps, valves, and the like; these can be readily furnished by those skilled in the art where required. Where desirable, known stabilizers for hydrogen peroxide, such as sodium stannate, potassium pyrophosphate, 8-hydroxy-quinoline, acetamide, or the like, may be introduced into the process streams at suitable points, in order to minimize any decomposition of the hydrogen peroxide during the purification thereof in and by the process of the invention. Throughout the present specification and in the claims, the pressures are given as mm. Hg, absolute.

The typical feed from which hydrogen peroxide is recovered and purified according to the process of the invention as described by means of Figure 2 will be a product that has been prepared by partial oxidation of a lower secondary aliphatic alcohol under conditions which direct the oxidation to yield hydrogen peroxide rather than water as the normal co-product of the oxidation, the organic oxidation product being the ketone which corresponds to the secondary alcohol. The crude feed preferably will contain isopropyl alcohol as the lower aliphatic secondary alcohol and acetone as the corresponding carbonyl compound. Instead of isopropyl alcohol and acetone, secondary butyl alcohol and methyl ethyl ketone may be present as the alcohol and carbonyl compounds, respectively. Such a feed may be produced, for example, by partial oxidation of isopropyl alcohol according to the processes described and claimed in pending application Serial No. 484,864, filed January 31, 1955, as a continuation-in-part of Serial No. 130,852, filed December 2, 1949. A typical feed will contain from about 1% to about 20% by weight hydrogen peroxide, from about 40% to about 90% by weight isopropyl alcohol, an amount of acetone approximately stoichiometrically equivalent to the hydrogen peroxide, a minor amount of water compared to the isopropyl alcohol and other organics, and the feed will include organic peroxides varying in amount from about 1% by weight of the hydrogen peroxide to an amount about equal to the hydrogen peroxide. A feed such as described is not charged directly to the solvent extraction of the present invention but is first subjected to fractionation, such as in column 202. Substantially all the alcohol and the corresponding ketone is removed overhead in such distillation and a substantial portion of organic peroxides may be decomposed during that distillation process.

The aqueous hydrogen peroxide solution removed as bottoms product from the first distillation contains organic impurities whose exact chemical structures have not been determined. These impurities are of relatively low volatility with respect to hydrogen peroxide. Chemically they appear to behave like a hydroxyhydroperoxide molecule. Such a molecule may be formed by the reaction of a carbonyl compound with hydrogen peroxide. Upon thermal treatment of the impurities, formaldehyde, formic acid, acetaldehyde and acetic acid may be found as degradation products.

The solvents suitable for use in the process of the present invention are polar organic solvents capable of hydrogen bonding, substantially immiscible with aqueous hydrogen peroxide solution, and substantially chemically inert to hydrogen peroxide, i.e. non-reactive therewith. Suitable solvents are organic compounds containing only carbon, hydrogen and oxygen, having the oxygen directly bonded to only a single carbon atom, and having at least 4 carbon atoms per molecule. Monofunctional compounds such as monohydric alcohols and monocarboxylic acids are ordinarily preferred because the polyfunctional compounds tend to be too water soluble. As the number of carbon atoms per oxygen atom in the solvent increases, the solubility of the impurities in the solvent decreases so that more solvent is required for effective extraction. Hence, it is not desirable to employ as oxygenated monofunctional solvents compounds having more than about 12 carbon atoms per molecule. Especially preferred solvents are normal butyl alcohol, isoamyl alcohol and caproic acid.

Essentially non-polar solvents, such as hydrocarbons, including aromatics, ethers, and chloroform, have been found entirely ineffective for the extraction of carbonaceous impurities from aqueous hydrogen peroxide as described. Aldehydes, though polar in nature, proved too reactive with hydrogen peroxide to be satisfactory. They are readily subject to conversion to acids.

Among the suitable solvents are alcohols such as n-butyl alcohol, isoamyl alcohol, cyclohexanol, methyl cyclohexanols, n-heptyl alcohol, n-octyl alcohol, 5-methyl hexanol, 2-heptanol, 3-methyl-3-heptanol and the like; carboxylic acids such as butyric acid, valeric acid, caproic acid, heptanoic acid and the like; ketones such as methyl propyl ketone, methyl isobutyl ketone, diisopropyl ketone, diisobutyl ketone and the like; and esters such as isoamyl acetate, butyl acetate and propylpropionate.

The conditions suitable for the various distillation and evaporation steps which may be associated with the solvent extraction process of the present invention have been presented above in the description of the process of Figure 2. The solvent extraction step itself may be carried out at substantially atmospheric temperature and pressure or at temperatures varying in the range between slightly above 0° C. and 120° C. The bottoms from tower 202 may, for instance, be contacted with solvent substantially at the temperature at which they leave the column, which may be in the range between 85° C. and 120° C. A preferred temperature range for the solvent extraction is between 10° C. and 60° C. The pressure may be any pressure at which the feed and solvent remain in liquid phase, but it will preferably be in a range between the pressure prevailing at the bottom of column 202 and about 760 mm. Hg.

The number of stages of contact to be employed and the ratio of solvent to feed to be employed will be determined according to well-known principles of solvent extraction. From 10 to 30 stages of counter-current contact will generally be found sufficient for extraction of substantially all of the organic impurities from the aqueous hydrogen peroxide. The solvent to feed ratio will be in the range between 0.5:1 and 10:1.

In general, it will be found that an appreciable amount of hydrogen peroxide will dissolve in the solvent during the contacting step. It will therefore be desirable to use a countersolvent or wash solvent to remove such hydrogen peroxide from the solvent and return it to the raffinate. Water is ordinarily employed as the wash solvent. In the process of Figure 2, a portion of the water leaving product fractionator 218 through line 221 may be condensed and employed as the countersolvent in the solvent extraction zone, i.e. that which is added through line 207a. The ratio of countersolvent to solvent will desirably be relatively small, in the range from 0.1:1 to 0.5:1.

The solvent extraction process of the present invention will be commercially attractive only if the solvent can be recovered from the extract stream, and also from the raffinate stream if it is present therein in appreciable concentration. Methods of recovering the solvent may vary with the chemical identity thereof and will readily occur to the skilled chemist or chemical engineer. For example, when the solvent is n-butyl alcohol a suitable method of separating it from the peroxidic and acidic impurities which it has extracted is by distillation in a separate fractionation zone in which caustic, such as sodium hydroxide, is maintained in the still pot or reboiler to neutralize the acids and prevent their decomposition. The n-butyl alcohol may be recovered as overhead product, and the impurities as bottoms product. Another suitable method may be to first contact the extract stream with aqueous caustic to neutralize and partially extract the acids and then extract the non-aqueous layer with a suitable second solvent, e.g. benzene, which dissolves the normal butyl alcohol. The liquid layers are then separated and the benzene layer is subjected to distillation to recover normal butyl alcohol and benzene suitable for re-use in the processes.

Since normal butyl alcohol is approximately 7% soluble in water, it will also be desirable to recover it from the raffinate. This may be done by a countercurrent liquid-liquid extraction with benzene which will readily extract the normal butyl alcohol. The alcohol and benzene are separated by distillation. Another suitable method of recovering normal butyl alcohol from the raffinate is by steam-stripping The present invention may be illustrated by means of the following examples.

Extraction experiments were carried out by contacting various volumes of aqueous hydrogen peroxide, containing peroxidic organic impurities and produced by a process of controlled oxidation of isopropyl alcohol, with various volumes of several different solvents under vigorous agitation for 10 to 15 minutes. After the layers had separated, samples of each were withdrawn and analyzed for hydrogen peroxide, total carbon and acids. The runs were carried out at room temperature. The results are presented in Table 1, below, in which the first column shows the class of solvent, the second column the identity of the solvent, the third column the solvent-to-feed ratio employed, the fourth and fifth columns the equilibrium constant "$k$" for organic impurities and hydrogen peroxide respectively, and the sixth column the "beta" value, which is the ratio of the equilibrium constants expressed as $k_{\text{impurities}}/k_{H_2O_2}$. The equilibrium constant is defined by the equation $$k = \frac{\text{Concentration of component 1 in phase 1}}{\text{Concentration of component 1 in phase 2}}$$

greatest capacity. Therefore less volume of solvent will be required when employing alcohols. Normal butyl alcohol is particularly outstanding, with a "$k$" value almost twice that of any other solvent tested. Hydrocarbons, specifically benzene and hexane, extracted no organic impurities; neither did chloroform. Diisopropyl ether had a beta value less than one, and thus tends to be a selective solvent for hydrogen peroxide, rather than for the organic impurities.

From the data in Table 1, suitable conditions for solvent extractions systems employing the various solvents are readily calculated. For example, the approximate conditions for a solvent extraction system such as illustrated in Figure 3 of the present application, using isoamyl alcohol as the solvent introduced by line 306 and water as the counter solvent introduced by line 307, are given in Table 2 below.

Table 2

| t, °C. | Feed | | | Theoretical Stages | | Solvent/Feed | | Recovery, Percent $H_2O_2$ | Purity a Percent $wt. H_2O_2$ |
|---|---|---|---|---|---|---|---|---|---|
| | Percent wt. $H_2O_2$ | Percent wt. C | Percent wt. $H_2O$ | Absorber | Stripper | Water | Alcohol | | |
| 25 | 30.00 | 1.00 | 69.00 | 10 | 10 | 1.4 | 5 | 99.0 | 99.6 | a With respect to organic impurities (corresponds to an 88 percent rejection of the organic impurities).

The results show that with a relatively large number of extraction stages the desired separation can be successfully accomplished with a reasonable solvent to feed ratio. If a greater amount of solvent is employed, less extraction stages will be required.

We claim as our invention:

1. The method of purifying aqueous hydrogen peroxide solution of at least 20% hydrogen peroxide content containing as impurities lower aliphatic alcohol, lower aliphatic carbonyl compound corresponding to the alcohol, and organic impurities comprising other oxygenated organic compounds than the alcohol and carbonyl compound and including organic peroxidic materials of divergent volatilities and stabilities, which comprises fractionally distilling said solution in a fractionation zone to take impurities comprising said lower aliphatic alcohol and said corresponding carbonylic compound overhead and to leave as bottoms product an aqueous solu-

Table 1

| Class of Solvent | Solvent | Solvent: Feed Ratio | $K_{\text{impurities}}$ | $K_{H_2O_2}$ | Beta Value |
|---|---|---|---|---|---|
| Acid | Caproic Acid | 5 | 0.30 | 0.03 | 10 |
| Alcohol | isoamyl alcohol | 1 | 0.43 | 0.23 | 1.9 |
| Do | n-butyl alcohol | 1 | 0.85 | 0.42 | 2.0 |
| Do | n-heptyl alcohol | 1 | 0.35 | 0.15 | 2.3 |
| Do | p-methyl cyclohexanol | 1 | 0.53 | 0.25 | 2.1 |
| Ketone | methyl isobutyl ketone | 5 | 0.27 | 0.16 | 1.7 |
| Do | diisobutyl ketone | 5 | 0.05 | 0.03 | 1.7 |
| Ester | isoamyl acetate | 1 | 0.16 | 0.11 | 1.5 |
| | diethyl phthalate | 5 | 0.09 | 0.05 | 1.8 |
| Nonsolvents: | | | | | |
| Hydrocarbon | Benzene | 1 | 0 | 0 | |
| | Hexane | 1 | 0 | 0 | |
| Ether | Diisopropyl ether | .5 | 0.04 | 0.06 | 0.6 |
| Chloroform | Chloroform | 1 | 0 | 0 | |

The data show that organic impurities are preferentially extracted from aqueous hydrogen peroxide solutions by the polar solvents such as acids, alcohols, esters and ketones; this is indicated by the fact that the beta value is greater than 1 for each of these materials. There is no substantial difference with respect to selectivity between the various solvents, except that caproic acid appears to be substantially more selective than the others.

The capacity of the various solvents for organic impurities is indicated by the "$k$" value in the fourth column. It is seen that the alcohols have the relatively tion of hydrogen peroxide comprising residual organic impurities comprising said organic peroxidic materials of divergent volatilities and stabilities, passing said distillation bottoms into an extraction zone, intimately contacting said bottoms product in said extraction zone with a polar organic solvent substantially immiscible with said bottoms product, substantially inert to hydrogen peroxide under the operating conditions and having from four to eight carbon atoms per molecule, thereby forming an extract phase consisting predominantly of said polar organic solvent comprising said residual organic impurities comprising said organic peroxidic materials of divergent volatilities and stabilities and an aqueous raffinate phase consisting predominantly of aqueous hydrogen peroxide in said extraction zone, separately withdrawing said raffinate and said extract phases from said extraction zone, and distilling said raffinate phase to recover hydrogen peroxide as an aqueous hydrogen peroxide fraction therefrom.

2. The process for purifying aqueous hydrogen peroxide solution containing lower aliphatic alcohol, lower aliphatic carbonyl compound corresponding to the alcohol, and organic impurities comprising other oxygenated organic compounds than the alcohol and carbonyl compound and including organic peroxidic materials of divergent volatilities and stabilities, comprising fractionally distilling said solution in a first fractionating zone to take lower aliphatic alcohol and corresponding carbonyl compound overhead and to leave fractionator bottoms consisting essentially of an aqueous solution of hydrogen peroxide of at least about 20% hydrogen peroxide content comprising residual organic compounds of low volatility with respect to hydrogen peroxide, intimately contacting said fractionator bottoms in a separate extraction zone with a polar organic solvent substantially immiscible with said fractionator bottoms, substantially inert to hydrogen peroxide under the operating conditions and having at least four carbon atoms to the molecule, thereby forming an extract phase consisting essentially of said polar organic solvent comprising said residual organic compounds of low volatility with respect to hydrogen peroxide and a raffinate phase consisting essentially of aqueous hydrogen peroxide in said extraction zone, passing said raffinate phase from said extraction zone into a vaporizing zone, vaporizing at least a portion of said raffinate phase in said vaporizing zone to yield a vaporous mixture comprising hydrogen peroxide and water, and fractionally distilling said vaporous mixture in a second fractionating zone to yield an aqueous solution of hydrogen peroxide as fractionator bottoms and water as fractionator overhead.

3. A process according to claim 2 wherein said solvent is caproic acid.

4. A process to claim 2 wherein said solvent is an alcohol.

5. A process according to claim 2 wherein said solvent is normal butyl alcohol.

6. A process according to claim 2 wherein said solvent is isoamyl alcohol.

7. A process according to claim 2 wherein said solvent is a monocarboxylic acid.

8. A process for purifying aqueous hydrogen peroxide solution containing lower aliphatic alcohol, lower aliphatic carbonyl compound corresponding to the alcohol, and organic impurities comprising other oxygenated organic compounds than the alcohol and carbonyl compound and including organic peroxidic materials of divergent volatilities and stabilities, comprising fractionally distilling said solution in a first fractionation zone to take lower aliphatic alcohol and corresponding carbonyl compound overhead and to leave as bottoms product an aqueous solution of hydrogen peroxide comprising residual organic compounds, adding a polar organic solvent substantially immiscible with said bottoms product, substantially inert to hydrogen peroxide under the operating conditions and having from 4 to 8 carbon atoms per molecule to said bottoms product, intimately contacting the two liquid phases, recovering a nonaqueous extract phase and an aqueous raffinate phase from said contact, in a separate evaporation zone evaporating at least a portion of said raffinate phase to yield a vaporous mixture comprising hydrogen peroxide and water and a liquid residue comprising water, hydrogen peroxide and residual impurities, partially condensing said vaporous mixture with rectification to yield as reflux to the evaporation zone a liquid condensate, in a second fractionation zone rectifying the uncondensed portion of said vaporous mixture to yield as bottoms product an aqueous solution of hydrogen peroxide and as overhead fraction essentially water, and withdrawing bottoms product from said evaporation zone and aqueous solution of hydrogen peroxide from said second fractionation zone.

9. A process for purifying aqueous hydrogen peroxide solution containing lower aliphatic alcohol, lower aliphatic carbonyl compound corresponding to the alcohol, and organic impurities comprising other oxygenated organic compounds than the alcohol and carbonyl compound and including organic peroxidic materials of divergent volatilities and stabilities, comprising fractionally distilling said solution in a first fractionation zone to take lower aliphatic alcohol and corresponding carbonyl compound overhead and to leave as bottoms product an aqueous solution of hydrogen peroxide comprising residual organic compounds, contacting said solution with a monofunctional first solvent substantially inert to hydrogen peroxide under the operating conditions, containing only carbon, hydrogen and oxygen wherein the oxygen is directly bonded to only a single carbon atom having from 4 to 8 carbon atoms per molecule in a first, multi-stage, countercurrent, liquid-liquid contacting zone to form therein as first stream an extract comprising essentially said first solvent, said impurities and some dissolved hydrogen peroxide and as second stream a raffinate comprising essentially aqueous hydrogen peroxide, contacting said first stream in a second contacting zone with an aqueous solvent to form a third stream comprising essentially only said first solvent and said impurities and a fourth stream comprising said aqueous solvent and hydrogen peroxide, returning said fourth stream to said first contacting zone, withdrawing said second stream from said first contacting zone, treating said second stream to recover residual first solvent therefrom, evaporating said treated second stream in an evaporation zone to yield a vaporous mixture comprising hydrogen peroxide and water and a liquid residue comprising water, hydrogen peroxide and residual impurities, partially condensing said vaporous mixture with rectification to yield as reflux to the evaporation zone a liquid condensate, in a second fractionation zone rectifying the uncondensed portion of said vaporous mixture to yield as bottoms product an aqueous solution of hydrogen peroxide and as overhead fraction essentially water, and withdrawing bottoms product from said evaporation zone and aqueous solution of hydrogen peroxide from said second fractionation zone.

10. A process according to claim 9 wherein said first solvent is an alcohol.

References Cited in the file of this patent

UNITED STATES PATENTS

| | | |
|---|---|---|
| 2,059,569 | Filson et al. | Nov. 3, 1936 |
| 2,158,525 | Riedl et al. | May 16, 1939 |
| 2,298,064 | MacMullin | Oct. 6, 1942 |
| 2,461,988 | Koorjman | Feb. 15, 1949 |
| 2,479,111 | Harris | Aug. 16, 1949 |
| 2,749,291 | Pierotti | June 5, 1956 |

OTHER REFERENCES

"Separation of Solutions of Formaldehyde and Hydrogen Peroxide by Liquid Extraction," M.S. Thesis by Juan V. Fernandez, Massachusetts Institute of Technology, February 1954, pp. 7–11.

Scheflan et al.: The Handbook of Solvents, D. Van Nostrand Co., Inc., New York, N.Y., 1953, page 187.